C. E. NOVILLE.
APPARATUS FOR SIMULATING MOVING PICTURES.
APPLICATION FILED MAR. 17, 1917.
1,288,145.
Patented Dec. 17, 1918.
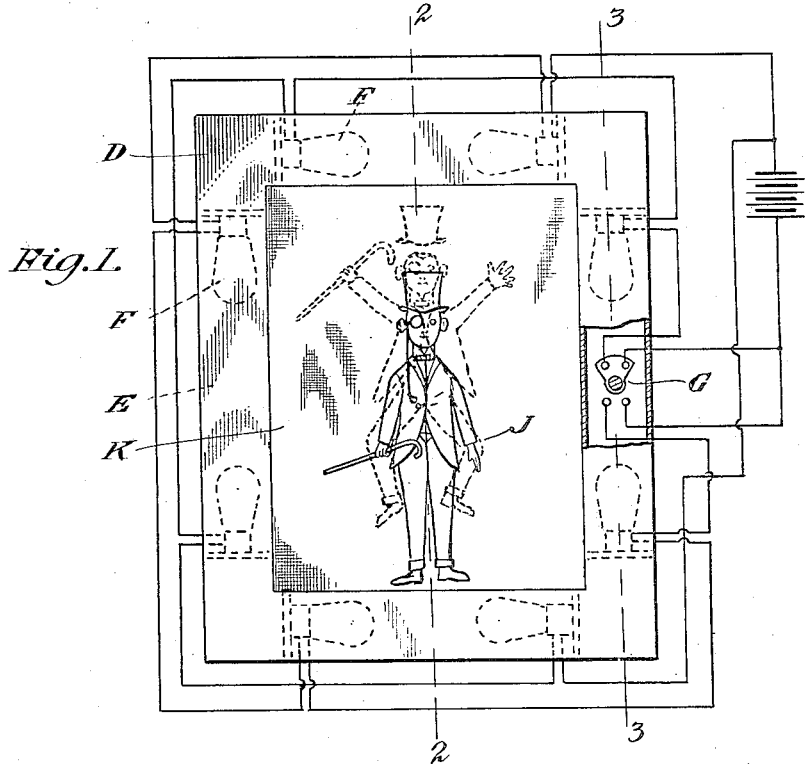
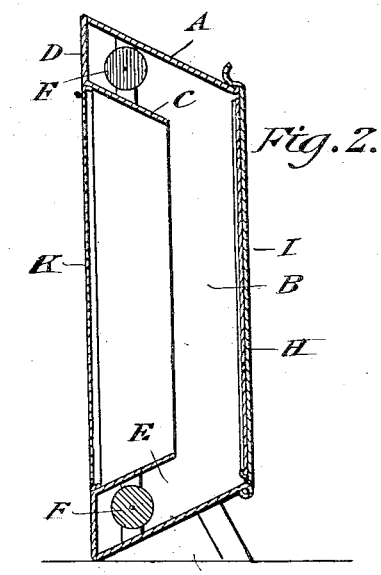
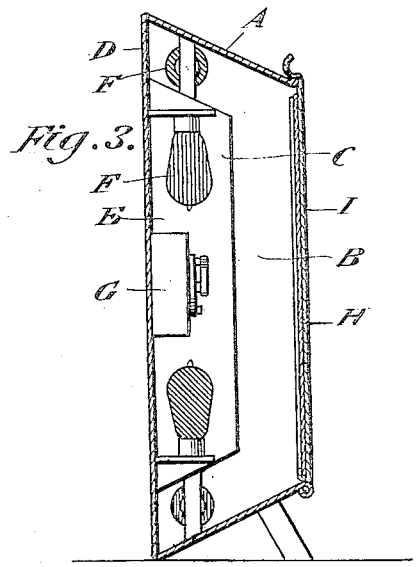
WITNESSES
INVENTOR
Carl E. Noville
BY Victor J. Evans
ATTORNEY

UNITED STATES PATENT OFFICE.

CARL E. NOVILLE, OF NEW YORK, N. Y., ASSIGNOR TO THE KAYANEN COMPANY, INC., OF NEW YORK, N. Y.

APPARATUS FOR SIMULATING MOVING PICTURES.

1,288,145.  Specification of Letters Patent.  Patented Dec. 17, 1918.

Application filed March 17, 1917.  Serial No. 155,560.

*To all whom it may concern:*

Be it known that I, CARL E. NOVILLE, a citizen of the United States, residing at New York, in the county of New York and State of New York, have invented new and useful Improvements in Apparatus for Simulating Moving Pictures, of which the following is a specification.

This invention relates to the method of simulating moving pictures and consists of a surface having a picture representation thereon with a plurality of positions of distinguishing colors with means for projecting light rays of harmonizing colors so that the positions will be intermittently masked to cause the picture to visually move.

An object of the invention is to provide a method of simulating moving pictures by means of intermittently flashing or projecting lights of distinguishing colors upon a surface bearing a picture representation thereon consisting of a plurality of positions of distinguishing colors which is of very simple construction, inexpensive to manufacture and thoroughly reliable and efficient in operation.

Another object of the invention is the provision of a method of simulating moving pictures, of the class described which may be used in connection with a means for automatically changing the surfaces in order to bring a plurality of said surfaces into position to be acted upon by the light projecting mechanism.

Another object of the invention is the provision of a screen to exclude enough exterior light from the surface containing the picture, to cause the device to be operable in the day as well as at night.

Other objects, advantages and uses will be readily apparent to those skilled in the art to which the invention appertains, when the description and claims are read in connection with the accompanying drawings, in which;

Figure 1 is a front elevation of a form of apparatus for putting into effect the method described.

Fig. 2 is a vertical cross section on the line 2—2, of Fig. 1.

Fig. 3 is a similar section on the line 3—3 of Fig. 1.

Referring to the drawings, it will be noted that I have shown an apparatus for displaying a sign or picture but I do not wish to limit myself to the exact details of construction exhibited in the drawings. A, represents a frame of substantially rectangular formation having inclined side walls B, the rear edges of which provide a sight opening through which the picture may be viewed. A second frame C, of similar construction is secured in spaced relation to the outer frame and supported by means of a facing D, which is secured to the front of the device. The inclined side walls B, are connected by similar top and bottom walls and the arrangement confines a space E, around the inner frame C, for the reception of a plurality of lights F, of distinguishing colors which are represented as electric bulbs in the drawings, the same being in circuit with a flashing means G, which may be of any well known construction. I have shown in the drawings, a picture H, which is supported at the rear of the frame by a hinged door I, but I do not wish to limit myself to this method of exhibiting the picture surface and wish it understood, that if desired, I can use a means for automatically displaying a plurality of pictures through the rear sight opening. The rear surface of the facing D, may be polished or provided with a reflecting element in order to more efficiently project the light rays upon the picture surface.

The operation of the device is as follows, presuming that the method herein described consists of only a two color process, which we will suppose for purpose of illustration, to be red and green. As shown, the picture surface is provided with a representation of a figure J, in full lines and another position of said figure in broken lines, the full lines representing green, and the broken lines red. Each alternate lamp is green, and others, red, so that when the flashing means indicated at G, is operated, first a green light is projected upon the picture surface thereby masking the green lines and showing only the red, but when the flashing mechanism operates to cut off the green light and project the red upon the picture surface, the red lines, represented by broken lines in the drawings, will be masked or obliterated and only the green will show. When this operation is repeated in rapid succession, the effect will be to produce a visual movement of the figure J.

Covering the front of the frame is a screen K, of black silk or any other material which will perform the function of excluding enough daylight or exterior light to make the device operable in the presence of a strong exterior light.

What is claimed as new is:—

1. A structure of the character described comprising, a frame covered at one side by a light excluding mask, means behind said mask bearing the images of an object having surfaces of distinguishing colors, and mechanism at the rear of said mask for alternately casting light reflections upon said images, of the same distinguishing colors as said surfaces so that life-like movements are set up in said surfaces.

2. In a structure of the class described, a frame closed at its display side by a light excluding mask, interchangeable elements adapted to be arranged at the rear of said mask and in spaced relation thereto and each bearing the images of an object to be displayed through said mask, the images being formed respectively of distinguishing colors, groups of lamps of the same distinguishing colors as those contained upon said images, and mechanism for actuating said groups of lamps to alternately cast contrasting light reflections upon said images to cause the same to appear animated and the portions of distinguishing colors thereof to appear visually to change positions.

In testimony whereof I affix my signature.

CARL E. NOVILLE.